United States Patent
Yung et al.

(10) Patent No.: US 9,922,123 B2
(45) Date of Patent: Mar. 20, 2018

(54) POLICY PERFORMANCE ORDERING

(71) Applicant: Facebook, Inc., Menlo Park, CA (US)

(72) Inventors: Raylene Yung, San Francisco, CA (US); Maria S. Pimenova, Mountain View, CA (US); Daniel Schafer, San Francisco, CA (US); Dwayne Reeves, Mountain View, CA (US); Wendy Mu, Menlo Park, CA (US); Kendall Hopkins, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 136 days.

(21) Appl. No.: 14/152,109

(22) Filed: Jan. 10, 2014

(65) Prior Publication Data

US 2015/0200816 A1 Jul. 16, 2015

(51) Int. Cl.
*G06F 9/45* (2006.01)
*G06F 11/34* (2006.01)
*G06F 17/30* (2006.01)
*G06Q 50/00* (2012.01)

(52) U.S. Cl.
CPC ........ *G06F 17/30867* (2013.01); *G06F 8/443* (2013.01); *G06F 11/3404* (2013.01); *G06Q 50/01* (2013.01)

(58) Field of Classification Search
None
See application file for complete search history.

(56) References Cited

U.S. PATENT DOCUMENTS

| | | |
|---|---|---|
| 6,330,610 B1 | 12/2001 | Docter et al. |
| 6,704,719 B1 | 3/2004 | Ericson et al. |
| 8,180,786 B2 | 5/2012 | Veanes et al. |
| 8,250,008 B1 | 8/2012 | Cao et al. |
| 8,407,789 B1 * | 3/2013 | Mears ................ H04L 63/0263 726/1 |
| 8,417,654 B1 | 4/2013 | Cao et al. |
| 8,478,707 B1 | 7/2013 | Ong et al. |
| 9,009,780 B2 | 4/2015 | Reeves et al. |
| 9,069,856 B1 | 6/2015 | Lilot et al. |

(Continued)

OTHER PUBLICATIONS

Non-Final Office Action dated Jul. 14, 2015, for U.S. Appl. No. 14/243,167 by Pimenova, M.S. et al., filed Mar. 2, 2014.

(Continued)

*Primary Examiner* — Shirley Zhang
(74) *Attorney, Agent, or Firm* — Perkins Coie LLP

(57) ABSTRACT

Technology for optimizing policy evaluation is disclosed. A policy may include an ordered rule set. When evaluated, the highest priority rule in the order that does not skip may control the outcome of the policy. Rules within a policy may have associated costs and an associated probability of not skipping. The rules of a policy may not need to be executed in a particular order for a system to determine the correct evaluation of the policy and groups of rules, or "batches," may be run simultaneously. Technology is disclosed to optimize policy evaluation by creating batches and orderings of those batches which have a lower expected cost than other ordered sets of batches. The expected cost for each ordered set of batches may be calculated based on: rule costs, probabilities associated with one or more rules, the organization of the rules into batches, and the ordering of batches within sets.

25 Claims, 13 Drawing Sheets

(56) References Cited

U.S. PATENT DOCUMENTS

| | | | |
|---|---|---|---|
| 9,276,960 | B2 | 3/2016 | Pimenova et al. |
| 9,432,053 | B1 | 8/2016 | Graumann et al. |
| 9,460,308 | B2 | 10/2016 | Zhao et al. |
| 2006/0200333 | A1 | 9/2006 | Dalal et al. |
| 2007/0055658 | A1 | 3/2007 | Hsiao et al. |
| 2007/0074188 | A1 | 3/2007 | Huang et al. |
| 2007/0150429 | A1 | 6/2007 | Huelsman et al. |
| 2009/0045971 | A1 | 2/2009 | Simons et al. |
| 2009/0193493 | A1 | 7/2009 | Becker et al. |
| 2009/0222393 | A1 | 9/2009 | Ganai |
| 2009/0254638 | A1 | 10/2009 | Spatscheck et al. |
| 2009/0265296 | A1 | 10/2009 | Narain et al. |
| 2009/0265319 | A1 | 10/2009 | Lehrman et al. |
| 2009/0326907 | A1 | 12/2009 | Gulwani et al. |
| 2010/0192130 | A1 | 7/2010 | Hawblitzel et al. |
| 2010/0306818 | A1 | 12/2010 | Li et al. |
| 2011/0246498 | A1 | 10/2011 | Forster et al. |
| 2012/0017260 | A1 | 1/2012 | Narain et al. |
| 2012/0192290 | A1 | 7/2012 | Barefoot et al. |
| 2012/0278700 | A1 | 11/2012 | Sullivan et al. |
| 2013/0198811 | A1 | 8/2013 | Yu et al. |
| 2013/0212266 | A1* | 8/2013 | Lyon ............... H04L 41/00 709/224 |
| 2013/0283339 | A1 | 10/2013 | Biswas et al. |
| 2014/0006522 | A1* | 1/2014 | Syrowitz ........... G06Q 10/107 709/206 |
| 2014/0282837 | A1 | 9/2014 | Heise et al. |
| 2015/0288718 | A1 | 10/2015 | Pimenova et al. |
| 2015/0310225 | A1 | 10/2015 | Heise et al. |
| 2015/0324600 | A1 | 11/2015 | Sethi et al. |
| 2016/0028769 | A1 | 1/2016 | Hopkins et al. |
| 2016/0127377 | A1 | 5/2016 | Pimenova et al. |
| 2016/0364581 | A1 | 12/2016 | Sethi et al. |

OTHER PUBLICATIONS

Notice of Allowance dated Sep. 23, 2015, for U.S. Appl. No. 14/243,167 by Pimenova, M.S. et al., filed Mar. 2, 2014.
Notice of Allowance dated Feb. 3, 2015, for U.S. Appl. No. 13/842,185 by Heise, S. et al., filed Mar. 15, 2013.
U.S. Appl. No. 14/639,329 by Heise, S. et al., filed Mar. 5, 2015.
Co-Pending U.S. Appl. No. 14/341,028 by Hopkins, K. et al., filed Jul. 25, 2014.
Co-Pending U.S. Appl. No. 13/842,185 by Heise, S. et al., filed Mar. 15, 2013.
Co-Pending U.S. Appl. No. 14/243,167 by Pimenova, M. et al., filed Apr. 2, 2014.
Co-Pending U.S. Appl. No. 14/274,460 by Sethi, B. et al., filed May 9, 2014.

Jayaraman et al., "Automatic Error Finding in Access-Control Policies", *CCS*'11, Oct. 17-21, 2011, 12 pages, ACM 978-1-4503-0948—Jun. 11, 2010, Chicago, IL.
"Mohawk: A tool for verifying access-control policies", Retrieved from https://code.google.com/p/mohawk/ on Mar. 7, 2013, 1 page.
"Papers and Talks", Retrieved from https://sites.google.com/site/jeevesprogramming/applications on Mar. 7, 2013, 3 pages.
"Satisfiability Modulo Theories", Retrieved from http://en.wikipedis.org/wiki/Satisfiability_Modulo_Theories on Mar. 7, 2013, 7 pages.
Swamp et al., "Secure Distributed Programming with Value-Dependent Types", ICFP'11, Sep. 19-21, 2011, 13 pages, ACM 978-1-4503-0865—Jun. 11, 2009, Tokyo, Japan.
Yang et al., "A Language for Automatically Enforcing Privacy", 31 pages, POPL/CSAIL.
Yang et al., "A Language for Automatically Enforcing Privacy", Talk given on Mar. 28,2012, 56 pages, Jeeves/CSAIL.
Yang et al., "A Language for Automatically Enforcing Privacy", Talk given on Jul. 27, 2011, 42 pages, Google NYC/CSAIL, New York, NY.
Yang et al., "A Language for Automatically Enforcing Privacy Policies", POPL'12, Jan. 25-27, 2012 12 pages, ACM 978-1-4503-1083—Mar. 12, 2001, Philadelphia, PA.
Yang et al., "Safe to the Last Instruction: Automated Verification of a Type-Safe Operating System", *PLDI*'10, Jun. 5-10, 2010, 12 pages, ACM 978-1-4503—0019/10/06, Toronto, Ontario, Canada.
"The Margrave Policy Analyzer", Retrieved from http://www.margrave-tool.org on Mar. 7,2013, 2 pages.
Non-Final Office Action dated Feb. 26, 2016, for U.S. Appl. No. 14/274,460 by Sethi, B., et al., filed May 9, 2014.
U.S. Appl. No. 14/986,535 by Pimenova, M. et al., filed Dec. 31, 2015.
Restriction Requirement dated Dec. 4, 2015, for U.S. Appl. No. 14/274,460 by Sethi, B., et al., filed May 9, 2014.
Non-Final Office Action dated Jun. 7, 2016, U.S. Appl. No. 14/639,329 by Heise, S. et al., filed Mar. 5, 2015.
Notice of Allowance dated Jun. 22, 2016, for U.S. Appl. No. 14/274,460 by Sethi, B., et al., filed May 9, 2014.
Non-Final Office Action dated Aug. 22, 2014, for U.S. Appl. No. 13/842,185 by Heise, S. et al., filed Mar. 15, 2013.
Notice of Allowance dated Oct. 23, 2015, for U.S. Appl. No. 14/243,167 by Pimenova, M.S. et al., filed Mar. 2, 2014.
Final Office Action dated Dec. 5, 2016 for U.S. Appl. No. 14/639,329 by Heise, S. et al., filed Mar. 5, 2015.
Non-Final Office Action dated May 5, 2017, for U.S. Appl. No. 14/986,535 by Pimenova, M.S. et al., filed Dec. 31, 2015.
Non-Final Office Action dated Jul. 3, 2017, for U.S. Appl. No. 14/639,329, of Heise, S., et al., filed Mar. 5, 2015.
Notice of Allowance dated Dec. 6, 2017 for U.S. Appl. No. 14/986,535 by Pimenova, M. et al., filed Dec. 31, 2015.
Non-Final Office Action dated Oct. 6, 2017 of U.S. Appl. No. 15/248,615 by Sethi, B.S., et al., filed Aug. 26, 2016.

* cited by examiner

1000

| Privacy Policy for Image Company Picnic.jpg | | | | | |
|---|---|---|---|---|---|
| Priority | Name | Type | Probability | Data Fetch Cost | Evaluation Cost |
| 1 | AllowIfAdmin (A1) | A-o-S | 2% | 0 | 10 |
| 2 | AllowIfReceivedShare (A2) | A-o-S | 10% | 2 | 20 |
| 3 | DenyIfNotInGroupCompanyC (D3) | D-o-S | 23% | 4 | 25 |
| 4 | AllowIfInGroupExecutives (A4) | A-o-S | 15% | 8 | 12 |
| 5 | DenyAll (D5) | D | 41% | 0 | 2 |

*FIG. 10*

POLICY PERFORMANCE ORDERING

BACKGROUND

As the Internet becomes integrated into almost every aspect of people's lives, the amount of content available is growing at an exponential rate. It is common for web providers to operate databases with petabytes of data, while leading content providers are already looking toward technology to handle exabyte implementations.

In addition, the tools used to access this vast resource are growing ever more sophisticated. Although users may believe that they are simply logging into a website, sophisticated server software may search through vast data stores of data to gather information relating to the users, for example based on their browsing history, preferences, data access permissions, location, demographics, etc. Simultaneously, the server may build a custom viewing experience for the users, e.g., using server-side languages. The result is often a fully interactive, media rich user experience. What information is analyzed and/or presented can be a function of various policies, e.g., data access policies, privacy policies, optimization policies, etc. (collectively, "policies"). Some of these policies are defined by software developers whereas other data can be provided by users.

These policies can be useful in social networking websites, e.g., to determine what advertising or other content to display to users, what actions users can take, etc. Analysis of all of the relevant policies to determine what subset of data to analyze and present can take considerable time. However, users can demand that this process occur with no perceptible delays, failing which they may simply navigate to a different web site. Therefore, determining what content will be gathered and how it may be presented is desirable to reduce web site delays caused by analyzing policies.

BRIEF DESCRIPTION OF THE DRAWINGS

FIG. 10 illustrates an example of a policy of structured rules that may be optimized using the disclosed technology.

DETAILED DESCRIPTION

Figure 1:
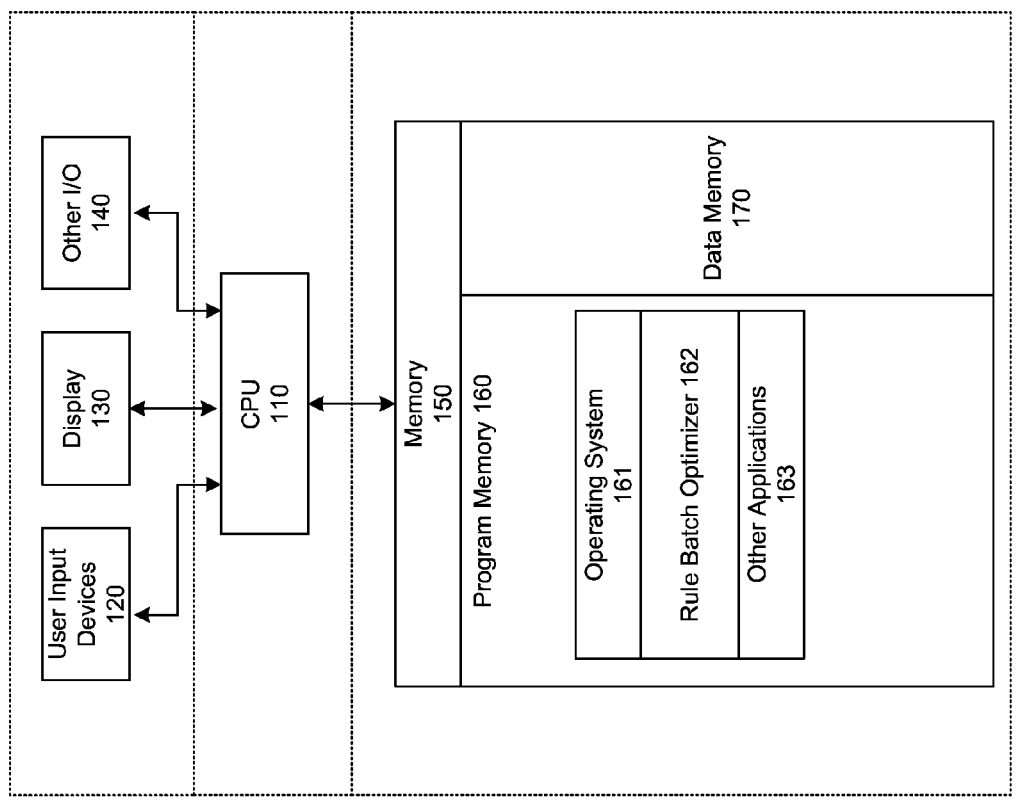
FIG. 1 is a block diagram illustrating an overview of devices on which some embodiments of the disclosed technology may operate.

Technology for reducing delays corresponding to implementing policies is disclosed. Policies can be provided by software developers, e.g., in conjunction with code they provide to determine what data is to be analyzed or presented to users. Policies can also (or instead) be specified by users, e.g., to indicate what data is to be shared or not shared with others. When evaluated, a policy may make a determination regarding whether a particular action should occur with respect to a particular object. For example, a viewing user may access a webpage that may include various objects (e.g., photos, posts, comments, etc., posted by other users). One or more policies may be associated with one or more of the various objects. For example, a photo may be associated with a policy that determines whether a viewing user can view the photo based on the privacy settings set by a user who published the photo. A web server may evaluate each policy for each object to determine whether the content should be included or excluded for viewing by the viewing user. Multiple such policies may need to be evaluated before determining whether to include or exclude the object. These policies are evaluated for each object that is eligible to be shown to the viewing user. When these evaluations are performed for a large number of concurrent viewing users (e.g., millions of concurrent viewing users) using a given pool of computational resources, the latency in obtaining an outcome for a particular object for a particular viewing user may be large. The embodiments disclosed herein reduce the computational cost and execution time for evaluating these policies so that the latency in obtaining an outcome for a particular object for a particular viewing user is reduced. In doing so, the overall user experience for all viewing users is improved.

In some embodiments, policies include ordered sets of rules. Each rule in a policy may have a corresponding type. In some embodiments, the types may be allow-or-skip and deny-or-skip. An allow-or-skip type indicates that the rule applies by allowing a particular action if its condition is true or the rule does not apply and is skipped if the condition is false. A deny-or-skip type indicates that the rule applies by denying a particular action if its condition is true or the rule does not apply and is skipped if the condition is false. A policy may be implemented such that the "highest" rule that applies (does not skip) in an ordering of the rules controls the outcome of policy. Thus, for example, if a policy has one allow-or-skip rule and one deny-or-skip rule and the corresponding conditions of the two rules is true, then the content will be displayed if the allow-or-skip rule is higher in the order than the deny-or-skip rule but the content will not be displayed if the deny-or-skip rule is higher in the order than the allow-or-skip rule.

Rules within a policy may have associated costs that are incurred, e.g., when the rules are enforced or evaluated, and these costs may vary greatly. The costs can relate to resource costs typically associated with computing, e.g., processor use, network latency, disk latency, etc. For example, an allowAdministrators rule may have a very low cost of retrieving the current user's rights level and determining if that rights level is administrator, whereas a denyIfNotInvited rule may have a much higher cost of retrieving a large list of all invited users and determining whether the current user is on that list. In addition, rules may have associated probabilities of applying (e.g., not skipping). For example, the allowAdministrators rule may have a very low probability of applying because only a few administrators, as compared to normal users, may be associated with a system. Conversely, a denyAlways rule may have a much higher probability of applying whereas some of the previous rules in the policy may have a lower probability of applying.

The rules of a policy may not need to be executed in a particular order for a system to determine the correct evaluation of the policy. In a policy where each rule can (1) allow or skip or (2) deny or skip, a system can guarantee that a particular rule that does not skip will provide a correct evaluation of a policy when all the rules with a higher priority of an opposite type skip. Therefore, in these situations where it is determined a particular rule returns a particular result and further that no higher priority rules return an opposite result, it does not matter if a higher priority rule, perhaps a rule that is more costly to evaluate, would have returned the same result. An "opposite type" of a particular rule, as used herein, is a rule (or rules) with one or more possible outcomes that are different than the outcome(s) of the particular rule, where the possible outcomes do not include the skip outcome. For example, in a policy where the rules may be of an allow-or-skip type or a deny-or-skip type, the opposite type of a rule that has an allow-or-skip type would be the deny-or-skip type. In some implementations, a policy may have non-binary rules or more than two types. For example, a policy may have deny-always or allow-always type rules; a policy may have rules with possible outcomes of allow, deny, skip, and call alternate function; or a policy may have allow-or-skip, deny-or-skip, and revert-to-subsequent-liner-execution-or-skip type rules.

As used herein, a "determinative set" or "determinative batch" is a group of rules comprising a particular rule, referred to herein as the "determinative rule," with all the rules with a higher priority that have an opposite type from the determinative rule. Determinative rules and determinative batches are discussed in more detail below in relation to FIG. 8A. A system may group one or more rules so that their data may be gathered and the rules executed concurrently. As used herein, such a group is referred to as a "batch." A system may create an ordering in which to execute batches, referred to herein as an "ordered set of batches."

In some embodiments, there may be many possible ways to group and order rules to created ordered sets of batches. A batch is a collection of rules, e.g., from different policies. System performance may be improved by evaluating a policy with an ordered set of batches, e.g., "optimized" to reduce costs. As used herein, an optimized ordered set of batches is an ordered set of batches that has been created with the intention of grouping and ordering batches such that a speed of policy evaluation is improved, or other costs are reduced.

In some embodiments, an optimized ordered set of batches may be selected for a received policy comprising two or more rules. A policy may define a priority ordering among the two or more rules and each rule may have a corresponding type. A cost may be calculated for, or associated with, each of the two or more rules. The optimized ordered set of batches may be selected from two or more ordered sets of batches comprising the two or more rules. Each ordered set of batches may define an execution order among the batches of that ordered set of batches. In addition, the sum of the batches of each ordered set of batches may include all of the two or more rules. A value may be assigned to each distinguished ordered set of batches of the two or more generated ordered sets of batches, where the value corresponds to an expected cost of that distinguished ordered set of batches. The expected cost for each distinguished ordered set of batches may be calculated based on: a cost determined for each rule, probabilities associated with one or more rules, the organization of the rules into batches for that distinguished ordered set of batches, and the relationship among the one or more batches of that distinguished ordered set of batches. The ordered set of batches with the lowest expected cost may be selected. In some embodiments, the batch selection and ordering need only be done once and can be done "offline" prior to a call for evaluation of the policy. For example, when a policy is created an optimization script may be run on the policy to perform batch creation and ordering. The optimized policy may then be incorporated in web server code responsive to user content requests.

Several embodiments of the described technology are discussed below in more detail in reference to the Figures. Turning now to the Figures, FIG. 1 is a block diagram illustrating an overview of devices 100 on which some embodiments of the disclosed technology may operate. The devices may comprise hardware components of a device 100 for implementing a policy evaluation optimization system. Device 100 includes one or more user input devices 120 that provide input to the CPU (processor) 110, notifying it of actions performed by a user. The actions are typically mediated by a hardware controller that interprets the signals received from the input device and communicates the information to the CPU 110 using a known communication protocol. Input devices 120 include, for example, a mouse, keyboard, a touchscreen, an infrared sensor, a touchpad, wearable input devices, a camera- or image-based input device, microphone, or other user input devices.

CPU 110 may be a single processing unit or multiple processing units in a device or distributed across multiple devices. CPU 110 may be coupled to other hardware devices, for example, with the use of a BUS, such as a PCI BUS or SCSI BUS. The CPU 110 may communicate with a hardware controller for devices such as for a display 130. Display 130 may be used to display text and graphics. One example of a display 130 is a display of the touchscreen that provides graphical and textual visual feedback to a user. In some implementations, the display includes the input device as part of the display, such as when the input device is a touchscreen. In some implementations, the display is separate from the input device. Examples of standalone display devices are: an LCD display screen, an LED display screen, a projected display (such as a heads-up display device), and so on. Other I/O devices 140 may also be coupled to the processor, such as a network, video, or audio card, USB or other external devices, printer, speakers, CD-ROM drive, DVD drive, disk drives, or Blu-Ray devices.

The processor 110 has access to a memory 150. A memory includes one or more of various hardware devices for volatile and non-volatile storage, and may include both read-only and writable memory. For example, a memory may comprise random access memory (RAM), read-only memory (ROM), writable non-volatile memory, such as flash memory, hard drives, floppy disks, CDs, DVDs, magnetic storage devices, tape drives, device buffers, and so forth. A memory is not a propagating electrical signal divorced from underlying hardware, and is thus non-transitory. The memory 150 includes program memory 160 that contains programs and software, such as an operating system 161, rule batch optimizer 162, and any other application programs 163. The memory 150 also includes data memory 170 that includes any configuration data, settings, user options and preferences that may be needed by the program memory 160, or any element of the device 100.

In some implementations, the device 100 also includes a communication device capable of communicating wirelessly or wire-based with a network node. The communication device may communicate with another device or a server through a network using, for example, TCP/IP protocols. For example, device 100 may utilize the communication device to distribute operations across multiple network devices.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
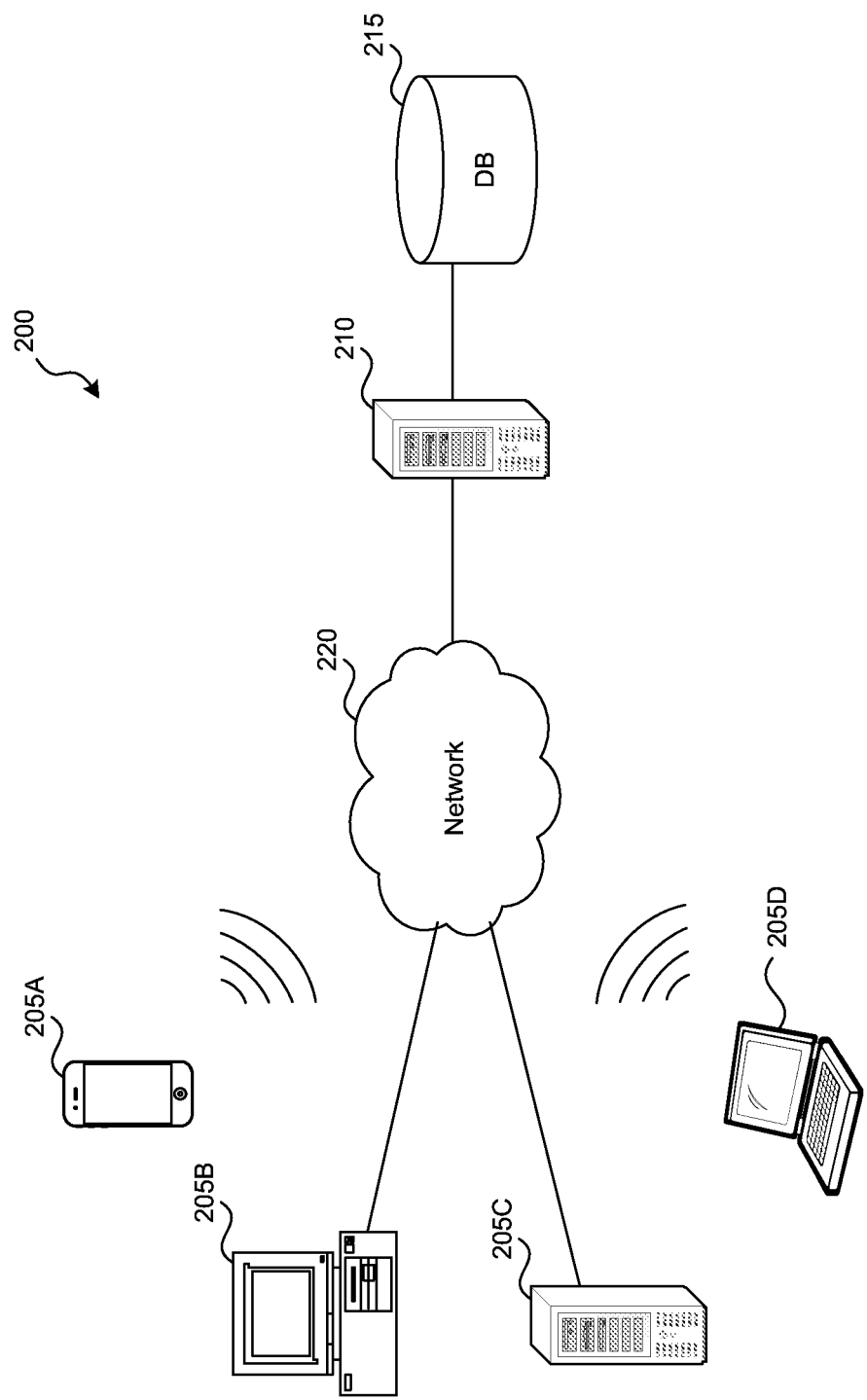
FIG. 2 is a block diagram illustrating an overview of an environment in which some embodiments of the disclosed technology may operate.

FIG. 2 is a block diagram 200 illustrating an overview of an environment in which some embodiments of the disclosed technology may operate. An environment for implementing the technology may include one or more client computing devices 205A-D, examples of which may include device 100. Client computing devices 205 may operate in a networked environment using logical connections to one or more remote computers such as server computing device 210 through network 220. Client computing devices 205 and server computing device 210 may each act as a server or client to other server/client devices. Server 210 may connect to a database 215. Database 215 may warehouse information such as rule cost and probability information from real world observations, benchmarking, or calculations such as the size of a data set corresponding to a particular rule.

Network 220 can be a local area network (LAN) or a wide area network (WAN), but may also be other wired or wireless networks. The client computing devices 205 can be connected to network 220 through a network interface, such as by a wired or wireless network.

Figure 3:
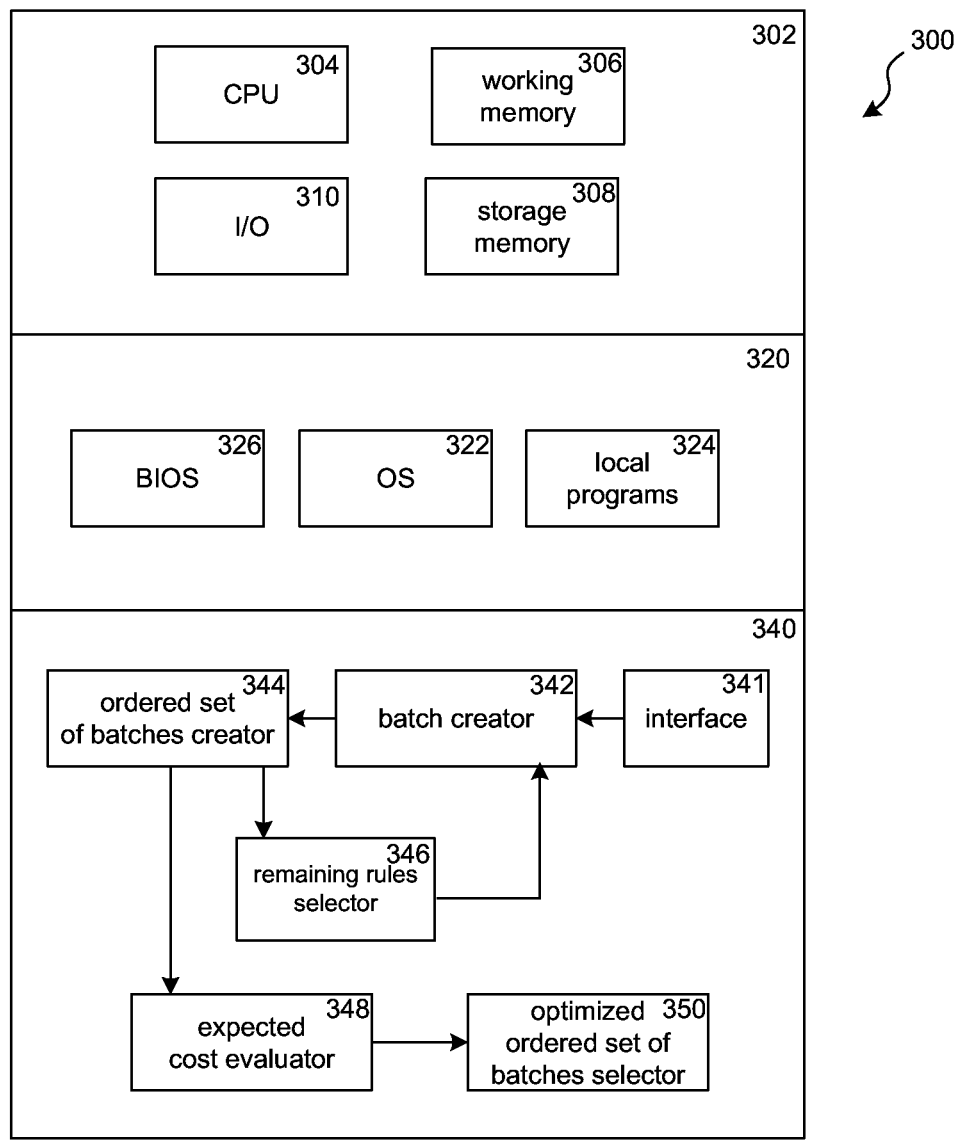
FIG. 3 is a block diagram illustrating components which, in some embodiments, may be used in a system implementing the disclosed technology.

FIG. 3 is a block diagram illustrating components 300 which may be used in a system implementing the disclosed technology. The components 300 include hardware 302, general software 320, and specialized components 340. As discussed above, a system implementing the disclosed technology may use various hardware including a central processing unit 304, working memory 306, storage memory 308, and input and output devices 310. Components 300 may be implemented in a client computing device such as client computing devices 205 or on a server computing device, such as server computing device 210.

General software 320 may include various applications including an operating system 322, local programs 324, and a BIOS 326. Specialized components 340 may be subcomponents of a general software application 320, such as a local program 324. Specialized components 340 may include a batch creator 342, an ordered set of batches creator 344, a remaining rule selector 346, an expected cost generator 348, and an optimized ordered set of batches selector 350.

An ordered set of rules may be received by interface 341. For example, interface 341 may receive rules from any of components 302 or 320, such as when a developer runs a command or when an automated optimization job is scheduled. Batch creator 342 may receive an ordered set of rules through interface 341, and create one or more batches of rules from the received ordered sets of rules. Examples of creating batches from received rules are discussed in more detail below in relation to FIGS. 8A and 8B.

Ordered set of batches creator 344 receives one or more batches and selects one or more orders in which to place the batches. Examples of creating ordered sets of batches are discussed in more detail below in relation to FIG. 6.

Remaining rule selector 346 may determine, based on a part of a particular order created by ordered set of batches creator 344, which rules at this point in that particular order may still need to be evaluated. These remaining rules may be passed to batch creator 342 to create additional batches for ordered set of batches creator 344 to add to various ordered sets of batches. Examples of determining remaining rules are discussed in more detail below in relation to FIGS. 9A and 9B.

The ordered sets of batches created by ordered set of batches creator 344 may be passed to expected cost evaluator 348. Expected cost evaluator 348 may calculate an expected cost for each of the ordered sets of batches it receives. Examples of calculating expected cost for a particular ordered set of batches are discussed in more detail below in relation to FIG. 7. Optimized ordered set of batches selector 350 may select the ordered set of batches with the lowest expected cost. Selected ordered sets of batches may be used by the device that created them, or may be sent to other devices such as a web server to implement in response to requested actions, such as a request by a user for a webpage with content associated with the policy.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. Some processes described below are described in terms of recursive algorithms. Those skilled in the art will further appreciate that equivalent implementations may be created without recursion.

Figure 4:
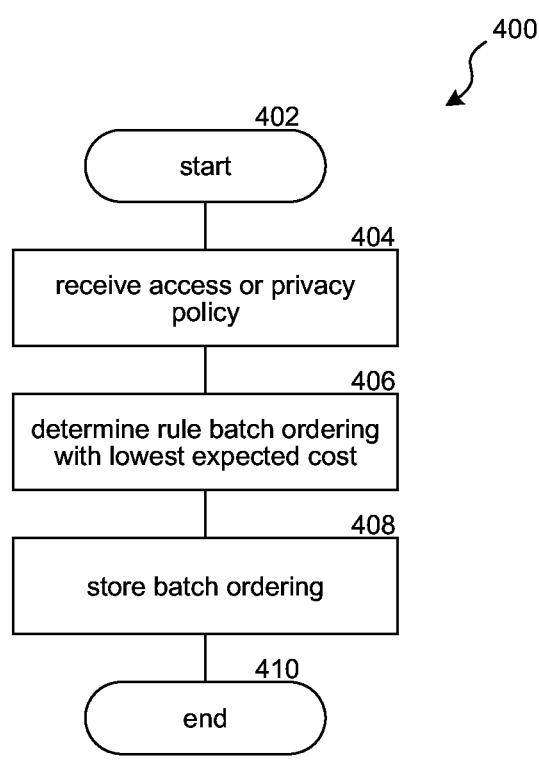
FIG. 4 is a flow diagram illustrating a process used in some embodiments for storing, based on a received policy, an optimized set of ordered rule batches.

FIG. 4 is a flow diagram illustrating a process 400 used in some embodiments for storing, based on a received policy, an optimized ordered set of rule batches. The process starts at block 402 and then receives a policy at block 404. The policy may be any number of policy types such as an authorization policy, a privacy policy, or a resource allocation policy. A received policy may include one or more rules that are organized according to a particular priority assigned to each rule. In some implementations, each rule has one of two types: allow-or-skip and deny-or-skip. A rule that has an allow-or-skip type will have corresponding criteria that, if met, results in the policy allowing if this is the highest priority rule that does not skip. Similarly, a rule that has a deny-or-skip type will have corresponding criteria that, if met, results in the policy denying if this is the highest priority rule that does not skip. In other implementations, rules may not be associated with a particular type, or may have other or additional types. If a rule skips, it is deferring to a lower priority rule to determine the outcome of the policy. The terms "allow" and "deny," and derivatives thereof, as used herein, may be replaced with other binary expressions such as true/false, 1/0, yes/no, and others. In addition, the term "skip," and derivatives thereof, may be replaced with other terms indicating the particular rule or batch did not make a determination for this policy evaluation but instead defers to lower priority rules.

At block 406, a process 500 determines an ordered set of batches corresponding to a lowest calculated expected cost. Process 500 is discussed in more detail below in relation to FIG. 5. At block 408, the process 400 stores an indication of the batch ordering. The stored indication may be used in later execution of the policy. For example, a policy with rules R1, R2, R3, R4, and R5 may be grouped in the following ordered set of batches [R2, R4]→[R1]→[R3, R5]. If this is the ordered set of batches that is selected as having the lowest expected cost, when the policy is implemented at a later time, rules R2 and R4 would be evaluated concurrently first. If the system can provably determine, based on the evaluated rules thus far, the outcome of the policy for this execution, the policy will return that outcome. If the system cannot make this provable determination, it will continue on to the next ordered batch, in this case R1. This process will repeat until the system can provably determine an outcome, or all rules have been evaluated. Once the process stores the batch ordering, it proceeds to block 410, where it ends.

Figure 5:
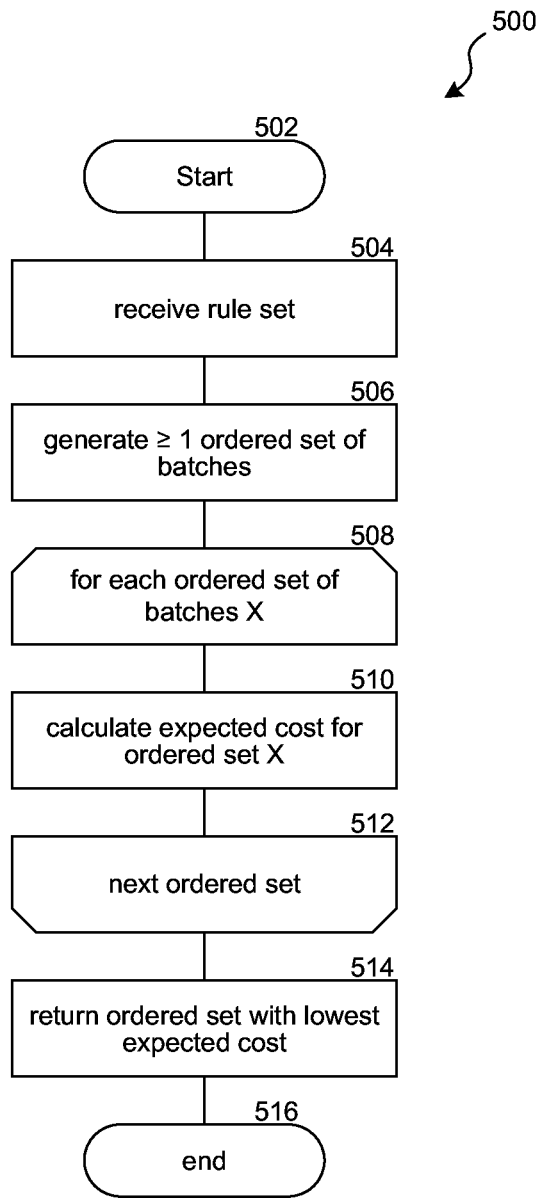
FIG. 5 is a flow diagram illustrating a process used in some embodiments for creating, based on an ordered set of rules of a policy, an optimized set of ordered rule batches.

FIG. 5 is a flow diagram illustrating a process 500 used in some embodiments for creating, based on an ordered set of rules of a policy, an optimized ordered set of rule batches. The process begins at block 502, then continues to block 504 where an ordered set of rules is received. At block 506 a process 600 generates at least one ordered set of batches. Some implementations for generating ordered sets of batches are discussed below in more detail in relation to FIG. 6.

At block 508, a loop for each of the ordered sets of batches generated in block 506, as ordered set of batches X, is begun. At block 510, an expected cost for ordered set of batches X is calculated and the expected cost is associated with ordered set of batches X. At block 512, the loop continues for the next of the ordered sets of batches.

At block 514, an indication of the ordered set of batches with the lowest expected cost is returned. At block 516 the process ends.

Figure 6:
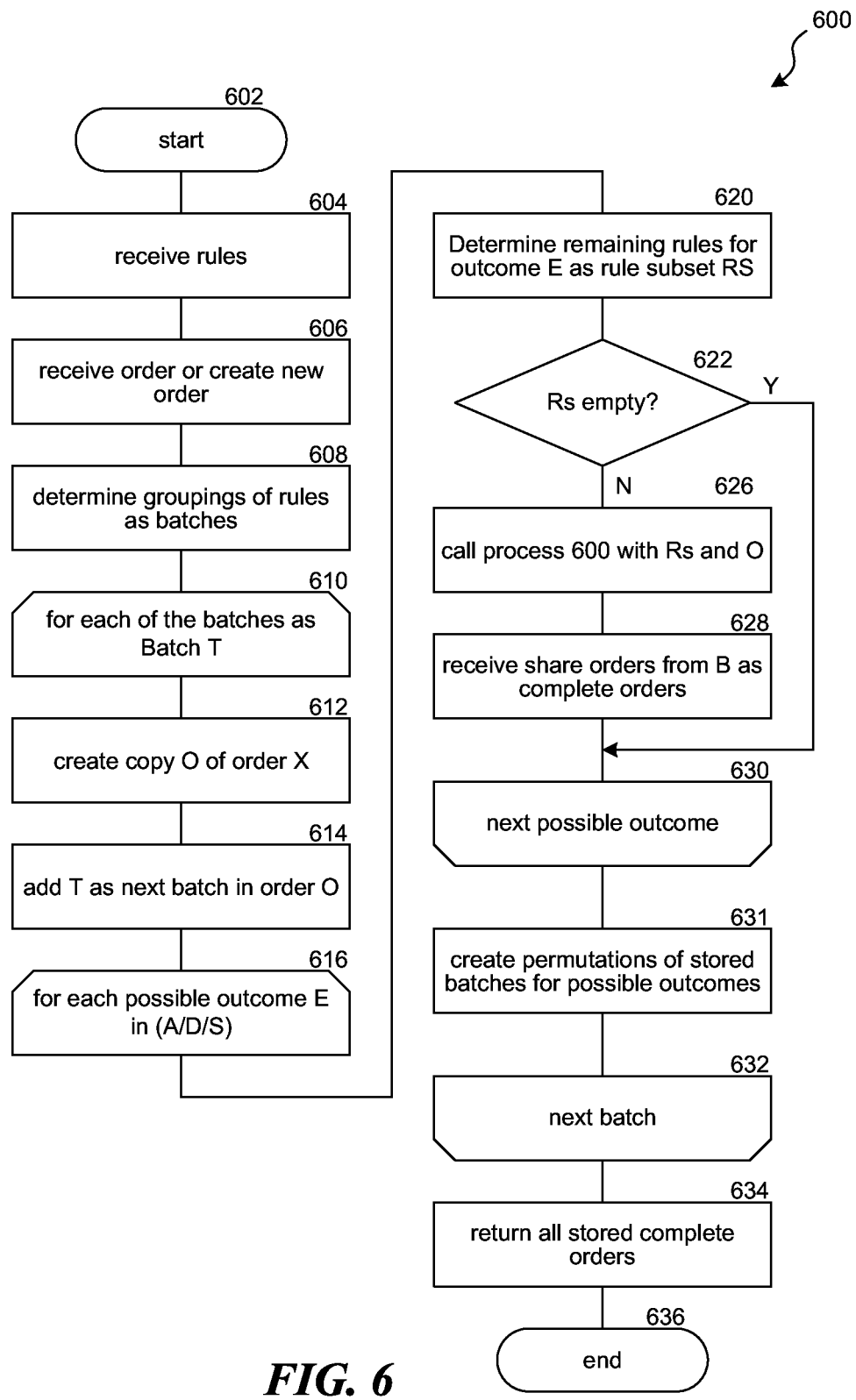
FIG. 6 is a flow diagram illustrating a process used in some embodiments for selecting, based on an ordered set of rules of a policy, possible ordered sets of ordered rule batches.

FIG. 6 is a flow diagram illustrating a process 600 used in some embodiments for selecting, based on an ordered set of rules of a policy, possible ordered sets of rule batches. The process begins at block 602 and continues to block 604, where a set of rules may be received.

At block 606, the process receives a portion of a previously created ordered set of batches, or creates a new ordered set of batches. In some implementations, a received order may have an associated indicator of a next_node, and an associated indicator of a next_node_type. In the case that block 606 creates a new ordered set of batches, the next_note indicator and next_node_type indicator may indicate null.

Next, at block 608, the process determines one or more groupings of the rules received in block 604, as batches. Examples of processes to determine groups of rules as batches are discussed in more detail below in relation to FIGS. 8A and 8B.

At block 610, the process begins a loop for each of the batches, as batch T, of the batches determine in block 608.

At block 612, the process creates a copy, O, of the portion of a previously created ordered set of batches received or created in block 606. Next, at block 614, the batch T is added to ordered set of batches O. In some implementations where a next_node indicator exists, batch T is appended in the order O after the batch indicated by the next_node indicator or is set to be the first item in the order O when the next_node indicator indicates null. In some implementations, where a next_node_type indicator exists, a type corresponding to the next_node_type indicator is associated with the link between batch T and the batch indicated by the next_node indicator.

At block 616, a loop is begun for each possible outcome, as outcome E, that may occur as a result of batch T. In some implementations, possible outcomes may be allow, deny, and skip. In some implementations, the possible outcomes for batch T may be an empty set because, no matter the result of batch T, the system may provably determine the result of the policy. In some implementations, each batch T may be evaluated to determine whether the rules of that batch T can result in each of the possible outcomes allow, deny, skip, and the list of possible outcomes may be reduced to remove from the list of possible outcomes those that are not possible. For example, a batch with the rules [allowIfAdministrator, denyAlways] has only two possible outcomes, allow and deny. As another example, a batch with the rules [allowIfAdministrator, allowIfInvited] may have possible outcomes of allow and skip.

At block 620, the rules that remain given possible outcome E for batch T are determined as rule subset RS. Determining which rules remain in some implementations is discussed in more detail below in relation to FIGS. 9A and 9B.

At block 622, the process determines whether rule set RS contains any rules. If so, the process continues to block 630. If not, the process continues to block 626.

At block 626, the process starts a new version of process 600 passing to the new version of process 600 rules RS and order O. In some implementations, a next_node indicator, indicating batch T in the order O, will be associated with passed order O. In some implementations a next_node_type indicator, indicating outcome E, will be associated with passed order O.

At block 628, one or more copies of order O will be returned with various child batch orders attached to batch T for outcome E. Each of the return copies of order O are kept as a stored ordered set of batches corresponding to outcome E.

At block 630, the process continues the loop of block 616 with the next possible outcome E. When the loop of block 616 completes, the process continues to block 631.

At block 631, the process has a stored ordered set of batches for each outcome E. The following notation is used: "[B1]" indicates a batch; "[B1](O1)[B2]" indicates a batch B1 where possible outcome O1 of B1 is followed by batch B2; and "[B3](O2)[B1](O1)[B2]" indicates a batch B1 where possible outcome O1 is followed by batch B2 and possible outcome O2 is followed by batch B3.

At block 631, the process creates all possible permutations of the stored ordered sets of batches where an ordered set is chosen from each outcome set and merged. For example, if the stored ordered sets of batches for outcome E=allow are:

{[A5, D2](A)→[A3]; [A5, D2](A)→[A4]; and [A5, D2](A→)[A3, A4] } and the stored ordered sets of batches for outcome E=skip are:

{[A5, D2](S)→[D1]; [A5, D2](S)→[A3, A4, D1]; [A5, D2](S)→[A3, D1]}

The result of block 631 will be the 9 complete ordered sets:

{[D1]←(S)[A5, D2](A)→[A3]
[A3, A4, D1]←(S)[A5, D2](A)→[A3]
[A3, D1]←(S)[A5, D2](A)→[A3]

[A3, A4, D1]←(S)[A5, D2](A)→[A4]
[A3, D1]←(S)[A5, D2](A)→[A4]
[A3, A4]←(S)[A4]←(S)[A5, D2](A)→[A4]
[A3, A4, D1]←(S)[A5, D2](A)→[A3, A4]
[A3, D1]←(S)[A5, D2](A)→[A3, A4]
[D1]←(S)[A5, D2](A)→[A3, A4] }

The process then continues to block 632. At block 632, the process continues the loop of block 610 with the next batch T. When the loop of block 610 completes, the process continues to block 634.

At block 634, the process returns all of the complete ordered sets of batches created at block 631. The process then continues to block 636 where it ends.

Figure 7:
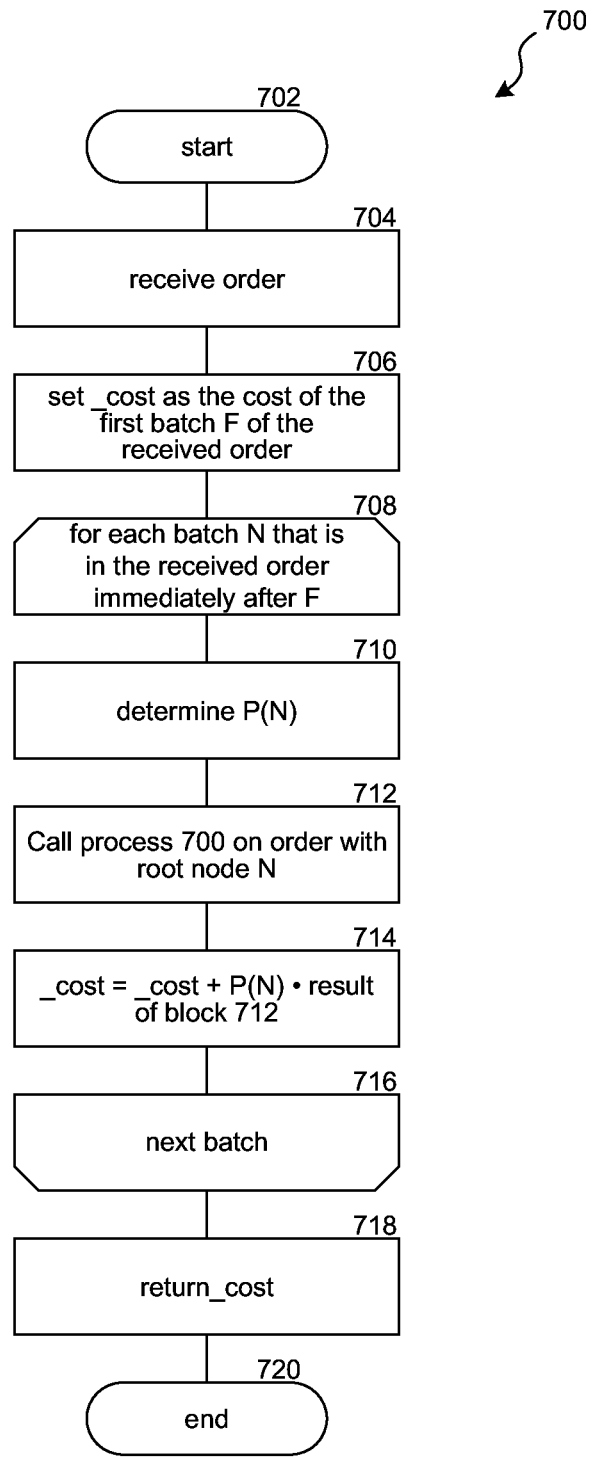
FIG. 7 is a flow diagram illustrating a process used in some embodiments for calculating, for an ordered set of rule batches, an expected cost.

FIG. 7 is a flow diagram illustrating a process 700 used in some embodiments for calculating, for an ordered set of rule batches, an expected cost. The process begins at block 702, and continues to block 704. At block 704, the process receives an ordered set of batches.

At block 706, the process determines a cost C of the first batch F in the received ordered set of batches. In some implementations, determining the cost of a batch is based on the cost associated with each of rule or sub-batch in the batch. In some implementations, each rule may have various types of costs such as processing costs and data fetch costs. The cost for a batch of rules may be the sum of the processing cost of each of those rules plus N times the largest data fetch cost for all the rules in the batch, where N is a value corresponding to an amount of time determined for one round trip to a server from which the data fetch is being requested. In some implementations, the cost of each rule or the cost of each batch of rules may be based on observed real-world or benchmark results. Block 706 sets a variable_cost=the determined cost of the first batch F.

At block 708, the process begins a loop for each batch N that, in the received order, is immediately after the first batch F.

At block 710, the process determines a probability P(N) indicating a likelihood that batch N will be the next evaluated in the order once F is evaluated. In some implementations, the determination of whether batch N will be the next batch once F is evaluated corresponds to a probability that batch F results in a particular type, such as allow, deny, or skip, and a corresponding type associated with the link between batch F and N. In some implementations, P(N) may further be based on recorded expert opinion, real-world observations, and benchmarking.

At block 712, the process begins a new version of this process 700, passing to it a subpart of the received order defined by the order with batch N as the first batch in the subpart.

At block 714, cost C is set to be previous value of costs C plus P(N) times the value returned by the new version of process 700, i.e. C=C+P(N)*new700(suborder).

At block 716, the process continues the loop of block 708 with the next batch after batch F as batch N. When the loop ends, the process then continues to block 718 where it returns calculated costs C. The process then continues to block 720 where it ends.

Figure 8A:
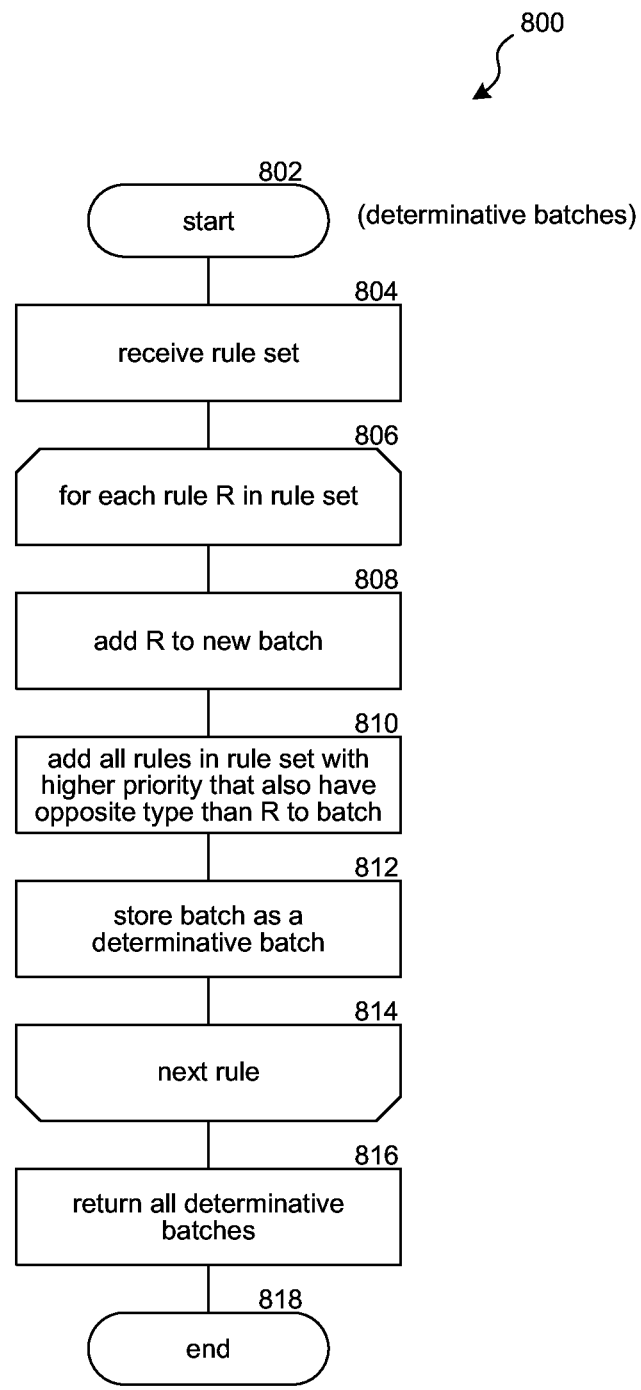
FIGS. 8A and 8B are flow diagrams illustrating processes used in some embodiments for selecting, based on an ordered set of rules, alternative possible next batches.

FIG. 8A is a flow diagram illustrating an example of a first process 800 used in some embodiments for selecting, based on an ordered set of rules, alternative possible next batches. Process 800 creates each next possible batch as a determinative batch for the remaining rules that may need to be evaluated for a given part of an ordered set of batches. Selecting the remaining rules that may need to be evaluated is discussed in greater detail below in relation to FIGS. 9A and 9B. A given policy may comprise a set of rules with a corresponding organization among the rues. For example the rules may be associated with priority values or the rules may be in an ordered structure such as a linked list. Each rule of the set of rules, when the policy is evaluated, may skip or evaluate to a particular result. A result of evaluating of the policy may be determined by the rule that both does not skip and is highest in the structure or that has the highest priority. For this type of policy, a particular rule R of the set of rules that does not skip can be guaranteed to provide a correct evaluation of the policy when all rules that have a higher priority than rule R, and that may evaluate to an outcome other than the outcome of rule R, skip. A rule that skips may indicate that the conditions of that rule do not apply and therefore defers to lower priority rules. For example, a rule allowAllAdministrators may skip when the current user is not an administrator. Therefore, for each rule R of a set of rules, a group of rules G may be selected such that if rule R does not skip, and each other rule in the group G skips, the outcome of the policy will correspond the outcome of rule R, regardless of the outcome of other rules in the set. In this case, group G is a "determinative set" and rule R is a "determinative rule." If group G is selected such that all the rules of group G are run together, then group G is a "determinative batch." In some embodiments of the disclosed technology, each batch in an ordered set of batches is a determinative batch for a set of remaining rules, given the rules run by the batches that are earlier in the order.

The process begins at block 802, and then continues to block 804, where a set of rules is received, each rule with a corresponding priority.

At block 806, a loop is begun for each of the rules, as rule R, in the received set of rules. At block 808, rule R is added to a new batch. In some embodiments consecutive rules of the same type may be grouped as an additional rule in the set of rules or in place of the rules of that group. This grouping process may be particularly beneficial in implementations where consecutive rules of the same type have a relatively high data fetch cost as compared to their evaluation cost. As a result, the data of these consecutive rules can be fetched in parallel and if a first of any of the consecutive rules applies evaluation of the other grouped rules may be skipped. In some embodiments, the new batch is indicated to have a type corresponding to rule R; this is the type for which the new batch is determinative. At block 810, all rules in a set of rules that have both a higher priority than rule R, and also are of a type opposite to rule R, are added to the batch. At block 812, the batch is stored as a determinative batch for the set of rules. At block 814, the loop of block 806 is continued with the next rule, as rule R, of the set of rules.

At block 816, all of the stored determinative batches are returned. The process then continues to block 818, where it ends.

Figure 8B:
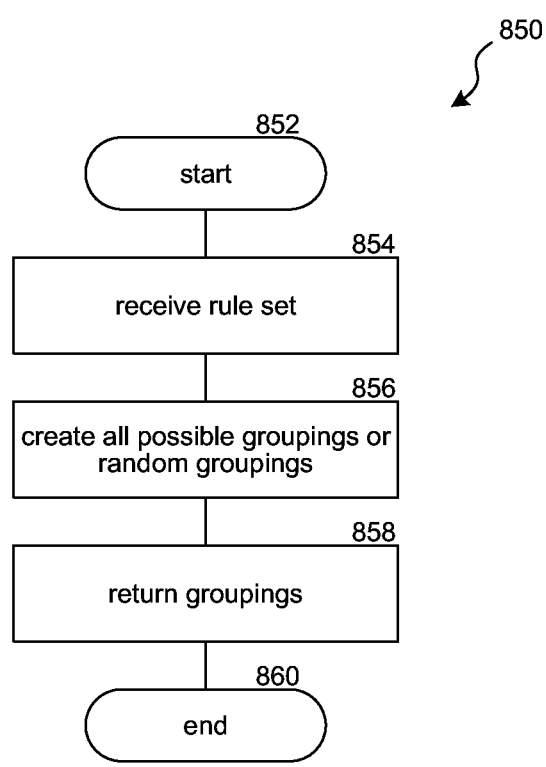

FIG. 8B is a flow diagram 850 illustrating an example of a second processes 850 used in some embodiments for selecting, based on an ordered set of rules, alternative possible next batches. In this example, the process may determine every possible ordered set of batches, or may select rules for each batch in an ordered set of batches at random.

The process begins at block 852, and continues to block 854 where a set of rules is received. The set of rules may have corresponding priorities.

At block 856, in some embodiments, the process creates every possible grouping of the set of rules. In other embodiments, the process creates one or more random grouping of the set of rules.

At block 858, each of the groupings created in block 856 is returned. The process then continues to block 860, where it ends.

Figure 9A:
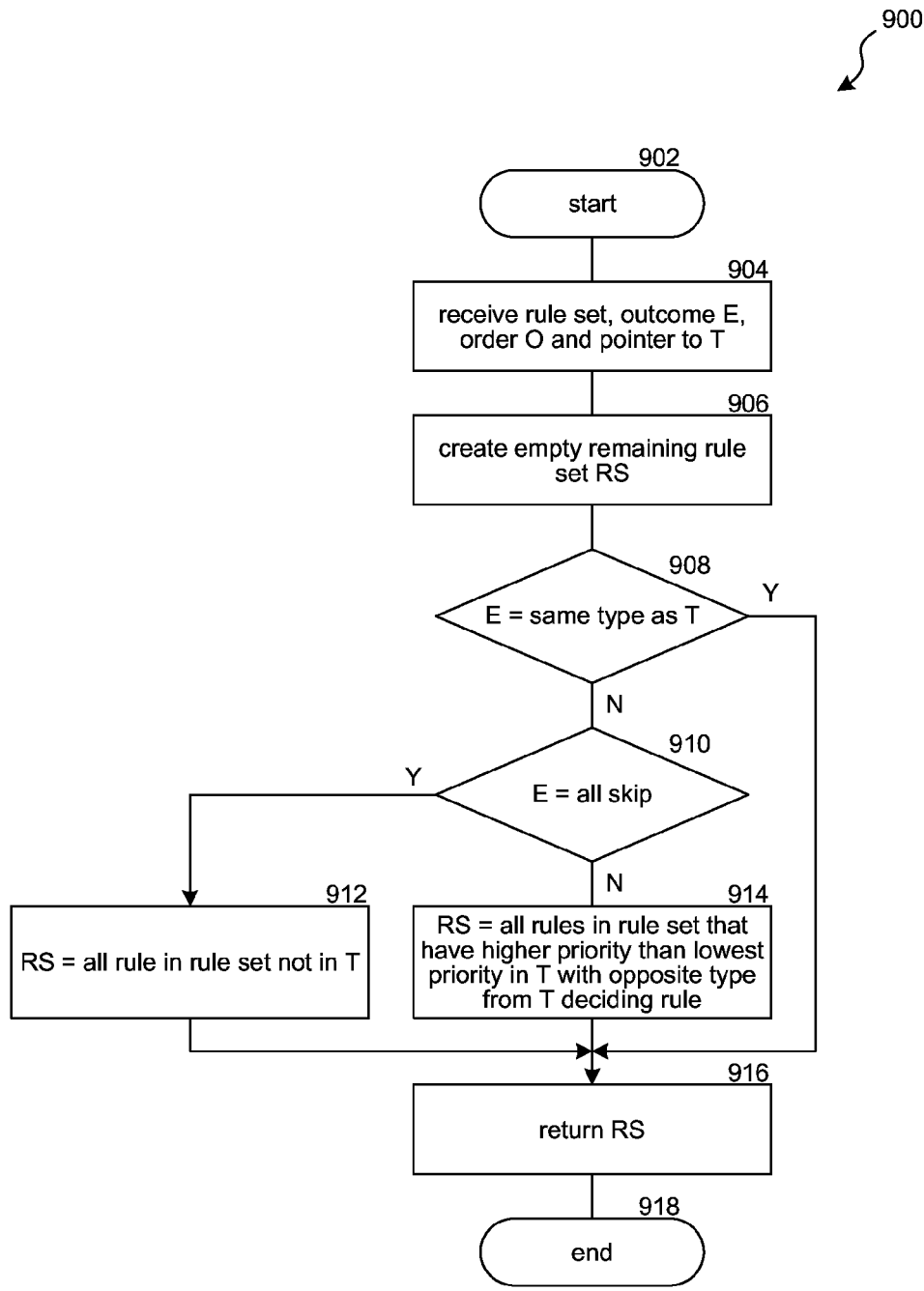
FIGS. 9A and 9B are flow diagrams illustrating processes used in some embodiments for selecting a remaining rule set to create a child structure.

FIG. 9A is a flow diagram illustrating an example of a first process 900 used in some embodiments for selecting a remaining rule set for creating a child structure. In some embodiments, process 900 selects the remaining rules that may affect the outcome of the policy given 1) that some rules of the policy have been run in previous batches, and 2) an outcome of the previous batch. The process begins at block 902 and continues to block 904.

At block 904, the process receives a set of rules with corresponding priority values, an order O, an indication of a particular batch T in the order O, and a given outcome E of batch T.

At block 906, the process creates an empty container RS for the set of remaining rules.

At block 908, the process determines whether type E is the same type for which batch T is determinative. If type E is the same type for which batch T is determinative, this indicates that result E is the result of the policy, and no further rules need to be evaluated. If this is true, the process continues to block 916, where it would return the empty remaining rule set RS. If type E is not the same type for which batch T is determinative, the process continues to block 910.

At block 910, the process determines whether type E indicates a skip outcome, indicating that all the rules in batch T resulted in a skip. When type E indicates a skip outcome, the process continues to block 912, otherwise the process continues to block 914.

At block 912, because all rules in batch T skip, any other rule in the rule set may control the outcome of the policy. Therefore at block 912, all the rules in the received rule set that are not in batch T are added to the container RS. The process then continues to block 916, where rule set RS is returned.

At block 914, because at least one rule in batch T returned result E for which batch T was not determinative, to determine if result E is the correct evaluation of the policy, all rules with an opposite type from type E that have a higher priority than one of the rules that returned a result must be evaluated. Therefore, in some first embodiments, at block 914, the process adds to rule set RS, all of the rules in the received rule set that have a priority higher than the deciding rule for batch T and that also have an opposite type from result E. In some second embodiments, at block 914, the process also has received an indication of which rules in batch T evaluated to result E. In these second embodiments, the process at block 914 may add to rule set RS all of the rules in the received rule set that 1) have a priority higher than the highest priority rule in batch T that returned result E and 2) also have an opposite type from result E. In some third embodiments, at block 914, the process adds to rule set RS all of the rules in the received rule set that have a priority higher than the deciding rule for batch T. In some fourth embodiments, at block 914, the process also has received an indication of which rules in batch T evaluated to result E. In these fourth embodiments, the process at block 914 may add to rule set RS all of the rules in the received rule set that have a priority higher than the highest priority rule in batch T that returned result E. The process then continues to block 916, where rule set RS is returned. After rule set RS is returned, the process continues to block 918, where it ends.

Figure 9B:
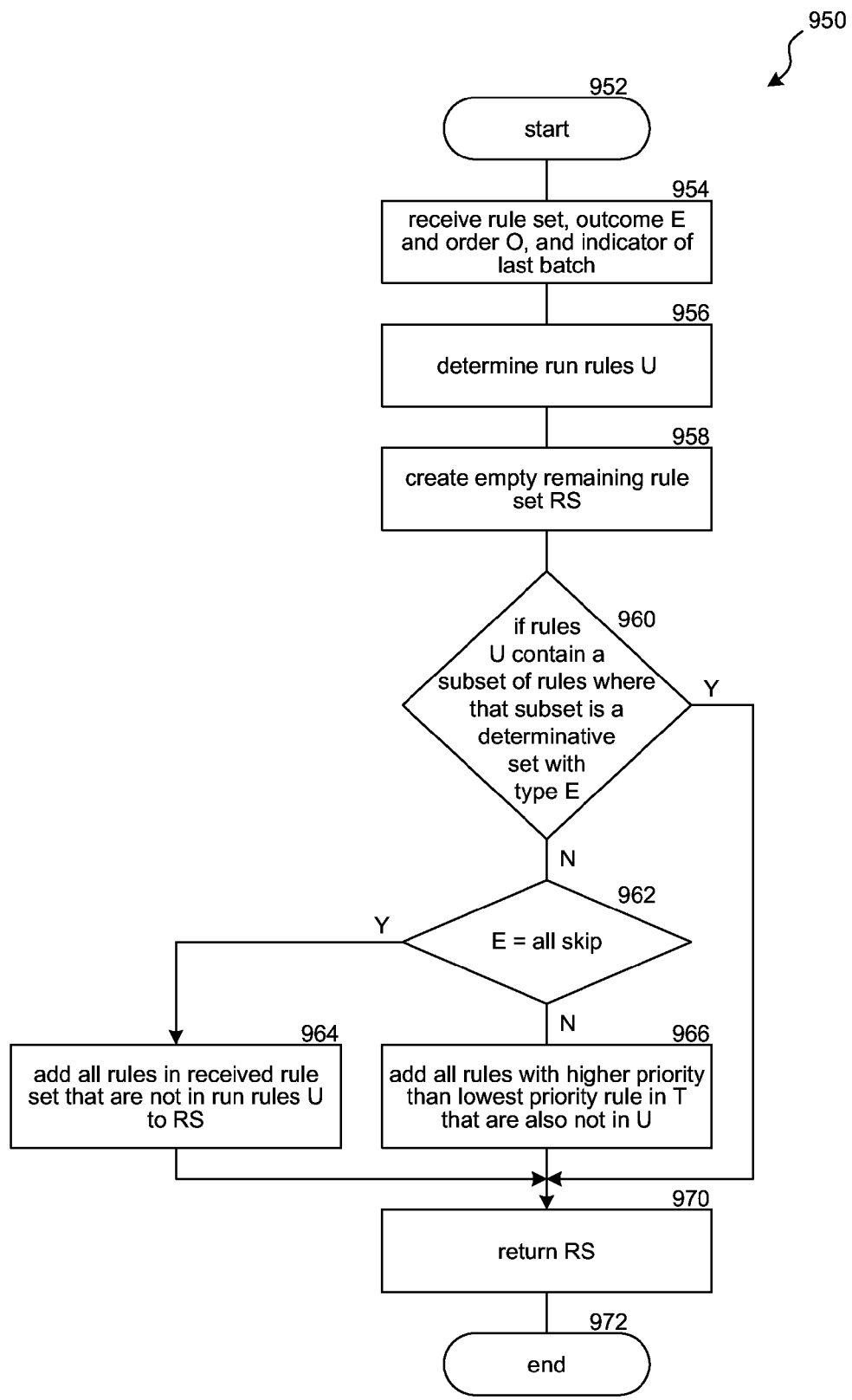

FIG. 9B is a flow diagram illustrating an example of a second process 950 used in some embodiments for selecting a remaining rule set to create a child structure. Process 950 makes no assumptions regarding whether previously evaluated batches were determinative. Therefore, when selecting additional rules that need to be evaluated, the process must examine the rules of every previously evaluated batch.

The process begins at block 952 and continues to block 954. At block 954, the process receives a rule set, an order of batches O, an indicator of a last batch T in order O, and an outcome E of batch T.

At block 956, the process evaluates the batches in order O to determine a set of rules U that have been evaluated. At block 958, the process creates an empty container for the remaining rules RS.

At block 960, the process determines whether the evaluated rules U contain a subset of rules where that subset is a determinative set with a determinative rule corresponding to outcome E. If so, no additional rules need to be evaluated; outcome E will be the outcome for the policy. In this case, the process continues to block 970, where it returns the empty rule set RS. If there is no determinative subset within U with a determinative rule corresponding to outcome E, the process continues to block 962.

At block 962, the process determines whether the outcome E indicates that all the rules in batch T skipped. This will indicate that no unevaluated rules may be eliminated from the rules that need to be evaluated to determine the outcome of the policy. Therefore, when the outcome E indicates that all the rules in batch T skipped, the process continues to block 964, where all rules in the received rule set that are not in the evaluated rules U are added to the remaining rule set RS. The process then continues to block 970, where it returns the rule set RS.

At block 966, the outcome E does not indicate that all the rules in batch T skipped, therefore some rule in batch T reached a result. However, because the rule that reached a result is not determinative in the set U, the process cannot determine, based on the evaluated rules, whether result E will be overridden by a rule that does not skip and has a higher priority. In some first embodiments, at block 966, the process adds to rule set RS all of the rules in the received rule set that are not in rules U that have a priority higher the lowest priority rule in batch T that also have an opposite type from result E. In some second embodiments, at block 966, the process also has received an indication of which rules in batch T evaluated to result E. In these second embodiments, the process at block 966 may add to rule set RS all of the rules in the received rule set that 1) have a priority higher than the highest priority rule in batch T that returned result E, 2) also have an opposite type from result E, and 3) are not in set U. In some third embodiments, at block 966, the process adds to rule set RS all of the rules in the received rule set that have a priority higher than the lowers priority rule in batch T that are also not in rules U. In some fourth embodiments, at block 966, the process also has received an indication of which rules in batch T evaluated to result E. In these fourth embodiments, the process at block 966 may add to rule set RS all of the rules in the received rule set that have a priority higher than the highest priority rule in batch T that returned result E and that are also not in rules U. The process then continues to block 970, where rule set RS is returned. After rule set RS is returned, the process continues to block 972, where it ends.

FIG. 10 illustrates an example of a policy 1000 of structured rules that may be optimized using the disclosed technology. Policy 1000 is associated with a particular portion of content: Company_Picnic.jpg, as illustrated in block 1002. Policy 1000 has a number of properties associated with each rule in the policy. Column 1004 identifies a priority value for each rule. Column 1006 identifies a name for each rule; each rule in column 1006 is also associated with a letter number combination (i.e. A1, D3) included for the ease of describing FIG. 11. Column 1008 identifies the type associate with each rule. In this example, the possible types are allow-or-skip (A-o-S), deny-or-skip (D-o-S), allow-always (A), and deny-always (D). Column 1010 identifies a probability that each rule will not skip, the items in this column may add up to more than, less than, or equal to 100%. Column 1012 identifies a data fetch cost associated with each rule. Column 1014 identifies an evaluation cost associated with each rule. In this example, there are five rules, listed in columns 1016-1024.

In some implementations, determining the actual cost of a particular rule is accomplished by adding the evaluation cost of that rule with N*the data fetch cost. In some implementations, determining the actual cost of a batch of rules is accomplished by adding the evaluation cost of each rule in the batch with N*the largest data fetch cost in the batch.

Figure 11:
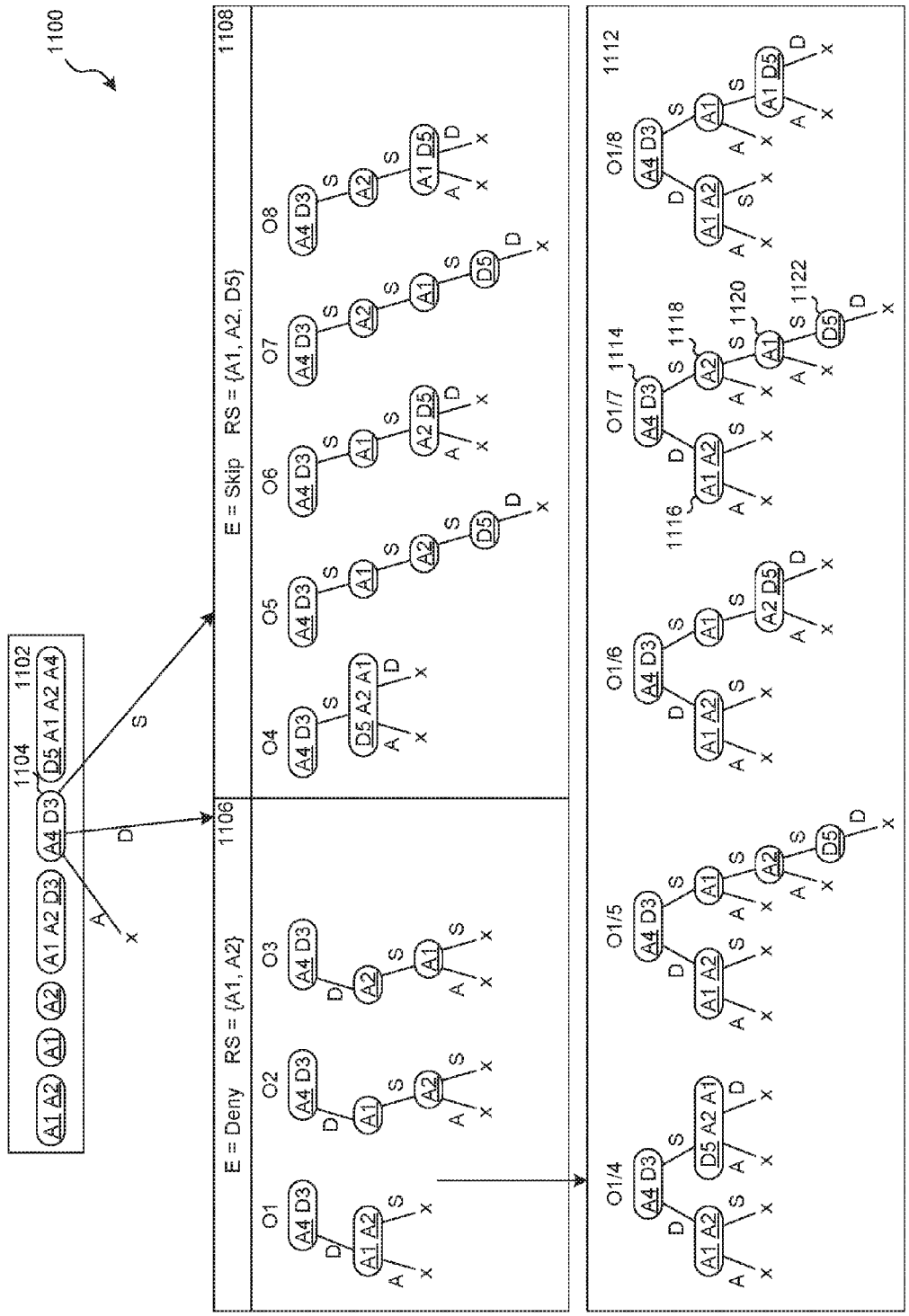
FIG. 11 illustrates an example of ordered sets of batches with corresponding expected costs that may be created using the disclosed technology for the example policy of FIG. 10.

FIG. 11 illustrates an example 1100 of some ordered sets of batches with corresponding expected costs that may be created using the disclosed technology for the example policy of FIG. 10.

Block 608 of FIG. 6 may use process 800 of FIG. 8A to determine an initial set of batches for a received ordered set of rules. In the case of the ordered set of rules from policy 1000, some implementations of process 800 returns the determinative batches identified in block 1102. As discussed above in relation to FIG. 8A, the six determinative batches in block 1102 include one batch created for each of the five rules in the policy and one batch created from a combination of consecutive rules of the same type. In each of the determinative batches, the rule or group of rules for which the batch was created is the determinative rule(s). In this example, the determinative rule in each determinative batch is underlined. For example, in batch 1104 rule A4 is underlined. This indicates that if the outcome of A4 is not skip (allow), and the other rules in the batch (D3) results in a skip, the outcome of A4 will be the outcome of the policy. For each created determinative batch, the rules with the opposite type from the determinative rule that also have a higher priority than the determinative rule are also added to that determinative batch. While the technology described herein may create many ordered set of batches starting with one of the determinative sets in block 1102, only some of the ordered sets of batches that start with batch 1104 are shown in FIG. 11.

Batch 1104 includes rules A4 and D3. For batch 1104, rule A4 is determinative, meaning that if a rule D3 skips and rule A4 does not skip (i.e. allows), the result of the policy corresponds to the result of batch 1104 (allow). There are three possible outcomes, E, for batch 1104. These are E=allow(A), E=deny(D), or E=skip(S). Process 600 of FIG. 6, at block 610, loops through each of these possible outcomes to create ordered sets.

In this example, for outcome E=Allow, at block 620 and in corresponding process 900 of FIG. 9A, E is of the same type as the determinative rule for batch 1104, and therefore no additional rules would have to be evaluated. This outcome is shown here with a line A (allow) ending in an x (no additional rules).

In this example, for outcome E=deny, at block 620 corresponding to process 900 of FIG. 9A, the process may determine that for this rule set, for batch 1104 with an outcome deny, the remaining rules are A1 and A2. In this case, non-determinative rule D3 resulted in a deny, and therefore rules A1 and A2 need to be checked to see if either overrides the outcome of D3. At block 626 of process 600, a new version of process 600 (referred to herein as 600B) is begun. Process 600B corresponds to block 1106 of FIG. 11, where the outcome E=deny and the rule set is RS={A1, A2}.

For block 1106, process 800 may create three determinative batches: [A1 A2], [A1], and [A2]. A copy of the order starting with batch [A4, D3] may be created for each of these determinative batches, labeled here as O1-O3, and one of [A1 A2], [A1], and [A2] may be appended to batch [A4, D3] in each copy, with associated type D (deny). In each case, if the result is allow, no additional rules need to be evaluated. The other possible outcome for each set [A1 A2], [A1], and [A2] is skip. In the case [A1 A2] results in a skip, no additional rules need to be evaluated as the result of D3 (deny) will be the result of the policy. If [A1] skips, A2 must be checked, and if [A2] skips, A1 must be checked, which in the case of process 600B, would result in two new calls to versions of process 600.

At block 628 of the original process 600 orders O1, O2, and O3 would be received and stored.

A similar process is conducted between blocks 616 and 630 for the possible outcome E=skip (S), which may have a rule set RS={A1, A2, D5}, determined by process 900. The call to the new version of process 600 at block 626 with E=skip and RS={A1, A2, D5} is shown by block 1108. Results of this block are orders O4-O8, which would also be stored by the original process 600 at block 628.

Block 631 of the original process 600 may now combine orders O1-O3 with orders O4-O8 to create the permutations of these two sets. This would result in 15 total possible orders beginning with [A4, D3]. The first five of these permutations are shown in block 1112 corresponding to combinations of O1 with O4-O8. A similar process may occur for combinations of O2 with O4-O8 and for combinations of O3 with O4-O8.

Using, as a further example, process 700, an expected cost for ordered set of batches 1114 in FIG. 11 may be determined. The Expected Cost ECO may be equal to the cost of the first batch plus the cost_sub of each sub ordering after the first batch, where each cost_sub is multiplied by a probability of that first batch having an outcome corresponding to each sub ordering.

The Expected Cost of order O1/7, identified as EC(order O1/7), referring to values from example policy 1000, may be based on the expected cost of each sub ordering starting with nodes 1116-1122. In some implementations, EC(order O1/7) may be determined by process 700, which may correspond to the following formulas. In these formulas, C( ) is a function for the actual cost of a set of rules defined as C(ruleSet)=sum(evaluation cost of each rule in ruleSet)+N*max(data fetch cost of ruleSet), and P( ) is a function for probability of a given result (A: Allow, D: Deny, or S: Skip) for a particular batch. For example, $P_{A4D3}$(D) below result in 0.23 because that is the probably any rule in the set [A4, D3] will result in a deny. N is the time for one round trip to a database. For ease of this example, N=10.

EC(order O1/7)=C([A4, D3])+$P_{A4D3}$(D)*EC(order 1116)+$P_{A4D3}$(S)*EC(order 1118)

C([A4, D3])=12+25+8N=1117

$P_{A4D3}$(D) 0.23 A4D3=

EC(order 1116)=C([A1, A2])=10+20+2N=50

$P_{A4D3}$(S)=(1−0.23)*(1−0.16)=0.65

EC(order 1118)=C([A2])+$P_{A2}$(S)*EC(order 1120)

$P_{A2}$(S)=1−0.1=0.9

EC(order 1120)=C([A1])+P$_{A1}$(S)*EC(1122)
P$_{A1}$(S)=1−0.02=0.98
EC(1122)=C([D5])=0+2+ON=2
Therefore:
EC(order 1120)=ON+10+0.98*2=11.96
EC(order 1118)=2N+20+0.9*11.96=50.764
EC(order O1/7)=12+25+8N+0.23*50+0.65*50.764=117+11.5+33=161.5

A similar process can be completed for each of the other determined ordered sets of batches. An ordered set of batches with the lowest expected cost may then be selected for policy 1000. By selecting the ordered set of batches with the lowest expected cost, significant policy evaluation performance gains can be realized. For example, if order O1/7 is selected as the order with the lowest expected cost, and if during policy evaluation rule A4 turns out to be the highest priority rule that returns a non-skip result, the cost of evaluating the policy drops from the C(A1, A2, D3, and A4)=207 to C(D3, A4)=157, a nearly 25% evaluation cost decrease, which, in this example, is likely to occur approximately 12% of the time. In this example, order O1/7 would not be selected because other orders not shown here will have a lower expected cost. The performance gains for the order with the actual lowest expected cost may be even more significant.

From the foregoing, it will be appreciated that specific embodiments have been described herein for purposes of illustration, but that various modifications may be made without deviating from the scope of the embodiments. Accordingly, the embodiments are not limited except as by the appended claims.

We claim:

1. A method performed by a computing device for reducing processing time for a policy, comprising:
   receiving the policy that includes two or more rules organized in a priority ordering based on priority values assigned to the two or more rules,
      wherein each rule of the two or more rules is associated with a condition,
      wherein at least one rule of the two or more rules allows a particular action in an event that the condition evaluates to an outcome amounting to true and skips in an event that the condition evaluates to an outcome amounting to false,
      wherein at least one other rule of the two or more rules denies the particular action in an event that the condition evaluates to an outcome amounting to true and skips in an event that the condition evaluates to an outcome amounting to false, and
      wherein the outcome of the policy is determined by whichever rule is highest in the priority ordering that does not amount to a skip;
   organizing the two or more rules into batches,
      wherein each batch includes a determinative rule of a first type having a certain priority value and any rules of a second type having a priority value higher than the certain priority value;
   identifying at least two ordered sets of batches,
      wherein each ordered set of batches that includes two or more batches represents a different execution ordering for the two or more rules of the policy, and
      wherein each ordered set of batches includes all of the two or more rules;
   for each ordered set of batches,
      computing an expected processing cost, wherein the expected processing cost is based on one or more of:
         a processing cost and a probability associated with each rule, the probability indicative of a likelihood that the corresponding rule will not skip,
         the organization of the two or more rules into batches for that ordered set of batches,
         the relationship among the batches of that ordered set of batches, or
         any combination thereof; and
   selecting an ordered set of batches, from among the at least two ordered sets of batches, having a lowest expected processing cost, wherein executions of the policy conform to the execution ordering corresponding to the selected ordered set of batches.

2. The method of claim 1, wherein executions of the policy that conform to the selected ordered set of batches are performed by:
   for each selected batch in the selected ordered set of batches; performing one or more of:
      gathering data for the selected batch concurrently;
      executing the one or more rules in the selected batch as a group; or
      any combination thereof.

3. A method performed by a computing device for reducing processing time for an ordered set of batches, comprising:
   receiving a policy comprising two or more rules organized in a priority ordering based on priority values assigned to the two or more rules, wherein each rule of the policy has a corresponding type;
   determining a processing cost associated with each rule of the two or more rules, the processing cost based on one or more of an execution cost for that rule and a data fetch cost for that rule;
   organizing the two or more rules into batches;
   identifying at least two ordered sets of batches, wherein each ordered set of batches comprises one or more batches, each ordered set of batches defines a relationship among the one or more batches of that ordered set of batches, and each ordered set of batches includes all of the two or more rules;
   for each distinguished ordered set of the ordered sets of batches, computing an expected processing cost, wherein the expected processing cost is based on one or more of:
      the processing cost determined for each rule and a probability indicative of a likelihood that rule will apply,
      the organization of the two or more rules into batches for that distinguished ordered set of batches, and
      the relationship among the one or more batches of that distinguished ordered set of batches; and
   selecting an ordered set of batches with the lowest expected processing cost as representative for the policy;
   wherein the relationship among the one or more batches of each ordered set of batches is created by:
      creating one or more first batches;
      for each distinguished previous batch of the distinguished ordered set of batches and for each distinguished possible outcome of the distinguished previous batch:
         creating a copy of a partial ordered set of batches comprising that distinguished previous batch,
         attaching, to that distinguished previous batch in the copy, a child structure, and associating with the attachment between that distinguished previous batch and the child structure, a type corresponding to that distinguished possible outcome.

4. The method of claim 3, wherein each distinguished child structure is created by determining, for this distinguished possible outcome:
a set of remaining rules; and
creating, as the distinguished child structure, a second optimized set of ordered rule batches for the remaining rules.

5. The method of claim 4, wherein:
each of the first batches is a determinative batch corresponding to each of the two or more rules, and
each specific batch of each ordered set of batches that is not a first batch is a determinative set for the set of remaining rules for the previous batch before the specific batch.

6. The method of claim 1, wherein the batches of each of the determined at least two ordered sets of batches are created by selecting all possible groupings of the two or more rules.

7. The method of claim 1, wherein each expected processing cost is calculated by traversing that ordered set of batches and adding, for each batch in that set of batches, a product of (A) a probability that batch will be reached when the ordered set of batches is implemented and (B) the cost of executing that batch.

8. The method of claim 1, wherein the probability is based on the probability associated with each rule in that batch.

9. The method of claim 1, wherein at least one rule in the policy is itself a set of two or more rules.

10. The method of claim 1, wherein for at least one of the distinguished ordered sets, one or both of the processing cost determined for at least one rule and the probability is based on observed results of evaluating one or more of the two or more rules.

11. A computer readable memory device storing instructions configured to, when executed by a computing device, cause the computing device to perform operations for reducing processing time for an ordered set of batches, the operations comprising:
receiving a policy that includes two or more rules organizing in a priority ordering based on priority values assigned to the two or more rules, wherein each rule of the two or more rules has a corresponding type;
for each distinguished rule of the two or more rules, creating a determinative batch;
identifying at least two ordered sets of batches, wherein:
for each distinguished ordered set of the ordered sets of batches:
the distinguished ordered set comprises at least one of the determinative batches as a first batch;
the distinguished ordered set defines a relationship among the batches of that distinguished ordered set of batches such that:
for each distinguished possible outcome of possible outcomes of a previous batch:
the previous batch has attached to it one or more subsequent child structures, and
the association between the previous batch and each child structure has a type corresponding to the distinguished possible outcome; and
the rules of all batches of the distinguished ordered set includes all of the two or more rules; and for each distinguished ordered set of batches, calculating an expected processing cost, the expected processing cost based on one or more of: a probability and a processing cost associated with each rule, the organization of the rules into batches for the distinguished ordered set of batches, and the relationship among the one or more batches of the distinguished ordered set of batches, wherein the processing cost associated with each rule is based on one or more of an execution cost for that rule and a data fetch cost for that rule; and
selecting a final ordered set of batches with the lowest expected processing cost.

12. The computer readable memory device of claim 11, wherein the probability is based on a rule probability associated with each rule.

13. The computer readable memory device of claim 11, wherein each batch has a possible outcome comprising skip and at least one of: allow and deny.

14. The computer readable memory device of claim 11, wherein creating each determinative batch comprises selecting that rule and each rule of a higher priority with an opposite type.

15. The computer readable memory device of claim 11, wherein each child structure is created by determining, for the distinguished possible outcome:
a set of remaining rules; and
creating, as the child structure, a second optimized set of ordered rule batches for the remaining rules.

16. The computer readable memory device of claim 11, wherein creating each determinative batch comprises:
selecting, as the rules of that determinative batch, the distinguished rule and each rule of a higher priority with an opposite type; and
associating with that determinative batch a determinative type corresponding to the type of the distinguished rule; and wherein,
the type of the possible outcomes are each one of: allow, deny, and skip,
and the set of remaining rules is created by:
when it is determined that the distinguished possible outcome is the same type as the determinative type for that distinguished previous batch, selecting, as the remaining rules, a rule set with no rules;
when it is determined that the distinguished possible outcome is skip, selecting, as the remaining rules, all rules from the two or more rules that are not in the distinguished previous batch; and
when it is determined that the distinguished possible outcome is an opposite type as the determinative type for that previous batch, selecting, as the remaining rules, a rule set with all the rules in the two or more rules that have a higher priority than a specific rule in the distinguished previous batch.

17. The computer readable memory device of claim 11, wherein each expected processing cost is calculated by traversing each distinguished ordered set of batches and adding, for each distinguished batch in that distinguished set of batches, a probability that distinguished batch will be reached when that distinguished ordered set of batches is implemented, multiplied by the processing cost of that distinguished batch.

18. A system for reducing processing time for an ordered set of rule batches, comprising:
a memory;
one or more processors;

an interface configured to receive a policy comprising two or more rules, wherein the policy defines a priority ordering among the two or more rules;

a batch creator calculator configured to determine, for the two or more rules or for remaining rules received from a remaining rule selector, two or more batches of rules, wherein at least one batch of the two or more batches comprise at least two rules of the two or more rules;

an ordered set of batches creator configured to receive the two or more batches and create two or more ordered sets of batches, each ordered set of batches comprising an initial batch corresponding to one of the two or more batches, wherein each of the ordered sets of batches that includes two or more batches defines a relationship among the two or more batches of that ordered set of batches, the relationship corresponding to an execution ordering for at least part of the policy, and wherein at least one initial batch in the two or more ordered sets of batches includes two or more rules, wherein a determinative rule of the two or more rules controls the outcome of the policy when the execution ordering reaches the at least one initial batch and all of the other rules in the at least one initial batch are evaluated to not apply because a condition associated with each rule all of the other rules in the at least one initial batch evaluate to an equivalent of false;

wherein the remaining rule selector is configured to determine, based on one or more particular batches of a part of one of the ordered set of batches, the set of remaining rules, the set of remaining rules being a subset of the received two or more rules excluding at least all the rules in one or more particular batches;

an expected processing cost evaluator configured to, for each ordered set of the ordered sets of batches, calculate an expected processing cost; and an optimized ordered set of batches selector configured to select the ordered set of batches with the lowest expected processing cost calculated by the expected cost evaluator.

19. The system of claim 18, wherein the remaining rule selector is further configured to determine the remaining set of rules based on one of one or more possible outcomes of a previous batch in an order created by the ordered set of batches creator.

20. The system of claim 18, wherein the expected cost is based on a cost associated with a group of one or more of the rules or a probability associated with a group of one or more of the rules, and wherein the cost or the probability is based on results observed from using the group of one or more rules.

21. A computer-implemented method for reducing computational cost and execution time for evaluating policies, comprising:

receiving a policy that includes two or more rules organized in a priority-based ordering based on priority values assigned to the two or more rules, wherein the two or more rules include at least one allow-or-skip rule and at least one deny-or-skip rule, and wherein an outcome of the policy is determined by whichever rule is highest in the priority-based ordering that does not amount to a skip;

organizing the two or more rules into determinative batches, wherein each determinative batch includes a determinative rule of a certain type having a certain priority value and any rules of an opposite type having a priority value higher than the certain priority value;

identifying at least two ordered sets of determinative batches, wherein each ordered set of determinative batches represents a different ordering in which to execute the two or more rules;

for each ordered set of determinative batches, computing an expected processing cost based on one or more of:

a processing cost and a probability associated with each rule, the probability indicating a likelihood that the corresponding rule will not skip, the organization of the two or more rules into determinative batches for a corresponding ordered set of determinative batches, the relationship among the one or more determinative batches of the corresponding ordered set of determinative batches, or any combination thereof;

selecting a certain ordered set of determinative batches having a lowest expected processing cost; and executing the policy by applying the two or more rules in accordance with a certain execution ordering specified by the certain ordered set of determinative batches, wherein applying the two or more rules in accordance with the certain execution ordering reduces latency in obtaining the outcome for the policy.

22. The method of claim 21, wherein each allow-or-skip rule allows a particular action in an event that a corresponding condition evaluates to an outcome amounting to true and skips in an event that the corresponding condition evaluates to an outcome amounting to false.

23. The method of claim 21, wherein each deny-or-skip rule denies a particular action in an event that a corresponding condition evaluates to an outcome amounting to true and skips in an event that the corresponding condition evaluates to an outcome amounting to false.

24. The method of claim 21, wherein each ordered set of determinative batches that includes two or more batches defines a relationship among the two or more batches that corresponds to an execution ordering for the two or more rules of the policy.

25. The method of claim 21, wherein the certain type is allow-or-skip and the opposite type is deny-or-skip, or vice versa.

* * * * *